(12) United States Patent
Bergström et al.

(10) Patent No.: US 9,247,540 B2
(45) Date of Patent: *Jan. 26, 2016

(54) EXTENDED USF ADDRESSING SPACE

(71) Applicant: Telefonaktiebolaget L M Ericsson, Stockholm (SE)

(72) Inventors: Andreas Bergström, Vikingstad (SE); Håkan Axelsson, Linköping (SE); Jens Bergqvist, Linköping (SE); Paul Schliwa-Bertling, Ljungsbro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/520,480

(22) Filed: Oct. 22, 2014

(65) Prior Publication Data

US 2015/0071266 A1     Mar. 12, 2015

Related U.S. Application Data

(63) Continuation of application No. 13/505,113, filed as application No. PCT/SE2010/050784 on Jul. 6, 2010, now Pat. No. 8,897,271.

(60) Provisional application No. 61/258,377, filed on Nov. 5, 2009.

(51) Int. Cl.
*H04W 72/04* (2009.01)
*H04J 3/00* (2006.01)
*H04W 8/26* (2009.01)
*H04W 72/12* (2009.01)

(52) U.S. Cl.
CPC ............ *H04W 72/0446* (2013.01); *H04W 8/26* (2013.01); *H04W 72/1289* (2013.01)

(58) Field of Classification Search
CPC .................... H04W 72/042; H04W 72/0413
USPC .................... 370/329, 336–337, 349; 455/446
See application file for complete search history.

(56) References Cited

U.S. PATENT DOCUMENTS

| 2004/0090948 A1* | 5/2004 | Forssell et al. | 370/349 |
| 2005/0180325 A1* | 8/2005 | Niemela et al. | 370/230 |

* cited by examiner

*Primary Examiner* — Andrew Chriss
*Assistant Examiner* — Romani Ohri
(74) *Attorney, Agent, or Firm* — Murphy, Bilak & Homiller, PLLC

(57) ABSTRACT

The present invention relates to assigning addresses to communication devices in a radio access network and notifying communication devices of scheduled uplink transmission time periods. Related methods, communication devices and control units are disclosed. A method of assigning an address to a communication device in a radio access network for use in notification of scheduled uplink transmission time periods for the communication device is provided. The method comprises assigning to the communication device an uplink state flag (USF) value. Furthermore, the method comprises assigning to the communication device an extended USF (eUSF) value. The address assigned to the communication device is a combination of the assigned USF value and the assigned eUSF value. By means of the eUSF value, the normal address range provided by the USF is extended, thereby facilitating use of more communication devices in the radio access network.

2 Claims, 5 Drawing Sheets

EXTENDED USF ADDRESSING SPACE

RELATED APPLICATIONS

This application is a continuation of U.S. patent application Ser. No. 13/505,113, filed 8 May 2012, which is the national stage entry under 35 U.S.C. §317 of international patent application serial no. PCT/SE2010/050784, filed 6 Jul. 2010, which claims priority to U.S. provisional application Ser. No. 61/258,377, filed May 11, 2009. The entire contents of each of the foregoing applications are incorporated herein by reference.

TECHNICAL FIELD

The present invention relates to assigning addresses to communication devices in a radio access network and notifying communication devices of scheduled uplink transmission time periods. Related methods, communication devices and control units are disclosed.

BACKGROUND

So far, the traffic generated in mobile networks such as e.g. GERAN (GSM (Global System for Mobile Communications), EDGE (Enhanced Data rates for GSM Evolution) Radio Access Network), and UTRAN (UMTS (Universal Mobile Telecommunications System) Terrestrial Radio Access Network) has mostly been dominated by services that require human interaction, such as e.g. regular speech calls, web-surfing, sending MMS (Multimedia Service Messaging) messages, doing video-chats etc. The same traffic pattern is also anticipated for E-UTRAN (Evolved-UTRAN). As a natural consequence, these networks are designed and optimized primarily for these "Human Type Communication" (HTC) services.

There is however an ever-increasing market segment of Machine Type Communication (MTC) services, which do not necessarily need human interaction. MTC includes a very diverse flora of applications ranging from e.g. vehicle applications (automatic emergency calls, remote diagnostics and telematics, vehicle tracking etc.) to gas- and power-meter readings and also network surveillance and cameras, just to give a few examples. The requirements these services put on the serving network, e.g. in terms of the number of communication devices to be served in the network, will likely differ from what is provided by today's HTC-optimized mobile networks.

SUMMARY

An object of the present invention is to facilitate use of a relatively large number of communication devices in a radio access network, such as a GERAN network.

According to a first aspect, there is provided a method of assigning an address to a communication device in a radio access network for use in notification of scheduled uplink transmission time periods for the communication device. The method comprises assigning to the communication device an uplink state flag (USF) value. Furthermore, the method comprises assigning to the communication device an extended USF (eUSF) value. The address assigned to the communication device is a combination of the assigned USF value and the assigned eUSF value. By means of the eUSF value, the normal address range provided by the USF is extended, thereby facilitating use of more communication devices in the radio access network.

Assigning the USF value may comprise selecting the USF value from a set of one or more legacy USF values, wherein each of the legacy USF values of said set can be assigned to a plurality of communication devices. Furthermore, assigning the eUSF value may comprise selecting the eUSF value as an eUSF value that uniquely identifies the communication device among a plurality of communication devices having the same assigned legacy USF value.

The method may further comprise sending the assigned USF value and the assigned eUSF value to the communication device in a message, such as but not limited to an uplink assignment or reconfiguration message.

According to a second aspect, there is provided a method of assigning addresses to a plurality of communication devices in a radio access network for use in notification of scheduled uplink transmission time periods for the communication devices. The method comprises, for each communication device in a first set of communication devices, assigning the address of the communication device using the method according to the first aspect.

The method may further comprise, for each communication device in a second set of communication devices, having no communication device in common with the first set, assigning the address of the communication device as a unique USF value. Hence, the communication devices in the second set may be addressed in a conventional way with only a USF value, whereas the communication devices in the first set may be addressed with a USF value in combination with an eUSF value.

Moreover, the method may comprise dynamically reserving a number of legacy USF values for assignment to communication devices in the first set based on the number of communication devices in the first set. For example, if there is no currently free combination of eUSF values and reserved legacy USF values, and one or more communication devices are added to the first set, the number of reserved legacy USF values may be increased to accommodate the added communication devices.

In any of the first and second aspects, the radio access network may be a GERAN network.

According to a third aspect, there is provided a method in a radio access network of notifying a communication device of an uplink transmission time period scheduled for the communication device. The method comprises sending, to the communication device a USF value assigned to the communication device. Furthermore, the method comprises sending, to the communication device, an eUSF value assigned to the communication device. Thereby, the communication device is notified that it has been granted uplink transmission opportunity in a subsequent time period.

The radio access network may e.g. be a GERAN network. In this situation, sending the eUSF value may comprise including the eUSF value in a portion of a RLC/MAC header that is sent to the communication device. Alternatively, sending the eUSF value may comprise including the eUSF in a PAN field that is sent to the communication device. Further alternatively, the eUSF value may be represented with an orthogonal training sequence code (TSC).

According to a fourth aspect, there is provided a control unit for a radio access network adapted to perform the method according to the first, second, and/or third aspect. The control unit may e.g. be or be comprised in a base station or base station controller. The radio access network may e.g. be a GERAN network.

According to a fifth aspect, there is provided a communication device for communication in a radio access network. The communication device is adapted to be addressed for notification of scheduled uplink transmission time periods for the communication device with an address, which is a combination of a USF value and an eUSF value that are assigned to the communication device. The radio access network may e.g. be a GERAN network.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which:

FIG. 4 B is a schematic drawing illustrating terminals connected to a communication server, wherein the terminals and/or the communication server may comprise arrangements or perform methods according to the present invention;

DETAILED DESCRIPTION

Figure 1:
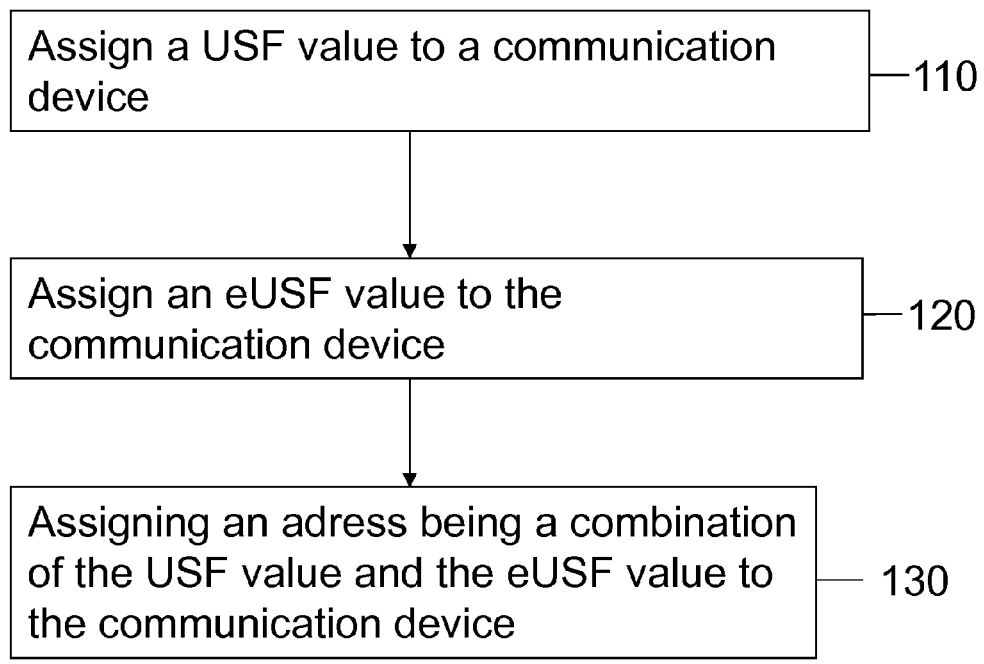
FIG. 1 is a flowchart illustrating method steps according to the present invention.

In accordance with embodiments of the present invention, the inventors have realized that one of the critical issues in e.g. GERAN is how the network shall be able to distinguish and properly address a relatively vast number of devices, whereas the available addressing spaces may not be sufficient. One of the identifiers that have been identified by the inventors as a potential bottleneck with respect to this is the Uplink State Flags (USFs) transmitted by the GERAN network to a Mobile Station (MS), or communication device, for the purpose of scheduling the MS for uplink transmission.

The USF is a value that uniquely identifies any given MS on its set of given uplink resources, such as a timeslot or PDCH (Packet Data CHannel). The USF is a 3-bit field encoded as a binary number in the range 0 to 7,which is initially provided to the MS by the GERAN network upon assignment. Thereafter, when the network wishes to schedule one particular MS for uplink transmission, the network will include the USF value corresponding to that MS in the downlink RLC/MAC data block. Any mobile station detecting its own assigned USF value in the received downlink RLC/MAC block thus knows that it has been granted uplink transmission opportunities during the following radio block period(s). The USF included in the downlink RLC/MAC block is channel-coded separately from the rest of the RLC/MAC header.

The numbers of possible USF values are limited by the available 3 bits, which thus allows for 8 individual values. Sometimes, the value '7' is reserved, which thus limits the number of values to 7. What this means is in practice is that it is not possible to assign more than 7 (or 8) users on the same timeslot in the uplink for these cases.

For 'normal' HTC communications (e.g. speech calls, web-surfing, sending MMS, video-chats etc.) this generally poses no problem, since the bottlenecks and capacity issues for these traffic types are normally related to available bandwidth, radio environment, hardware availability etc. rather than addressing spaces. In contrast however, the characteristics of MTC communications are expected to in many cases be quite different. Therefore, for these kinds of services, it might be beneficial to multiplex perhaps dozens or more users of the same uplink PDCH.

Thus, the inventors have realized that the addressing space for the USF values needs to be expanded beyond the 7-8 unique values which are possible with the 3 bits provided today.

According to some embodiments of the present invention, one or more code points from the legacy USF addressing space are reserved for a particular type of devices and a new, separate extended USF (eUSF) field is introduced, e.g. in the transmitted downlink RLC (Radio Link Control)/MAC (Medium Access Control) block. The reserved legacy USF code points are then to be combined with the eUSF field in order to increase the total available USF addressing space. The legacy USF code point, which is combined with the eUSF code point, can also be assigned or reserved dynamically.

The bits to be used for the new eUSF-field could e.g. be taken from the not used spare bits that exist in many of the RLC/MAC headers. Alternatively, new RLC/MAC Headers may be defined that have room for this eUSF field. Other alternatives could include to either use the already existing PAN (Piggy-backed Ack/Nack) field for the eUSF field or to use different TSCs (Training Sequence Codes), sent orthogonally to the downlink RLC/MAC block. In the following, the term legacy MS is used for MSs, or communication devices, assigned/assignable with the unreserved legacy USF code points only, whereas MSs, or communication devices, assigned/assignable with the reserved legacy USF code points in combination with the eUSF field are referred to as "new devices" (which could e.g. be MTC devices, but may also be HTC devices).

According to embodiments of the present invention, as exemplified in FIG. 1, methods are provided for assigning addresses to one or more communication devices in a radio access network for use in notification of scheduled uplink transmission time periods for the communication devices. The method as illustrated in FIG. 1 comprises the steps of assigning 110 a legacy USF value to a communication device, assigning 120 an evolved eUSF value to the communication device, and assigning 130 an address being a combination of the assigned legacy USF value and the assigned eUSF value to the communication device.

Figure 2:
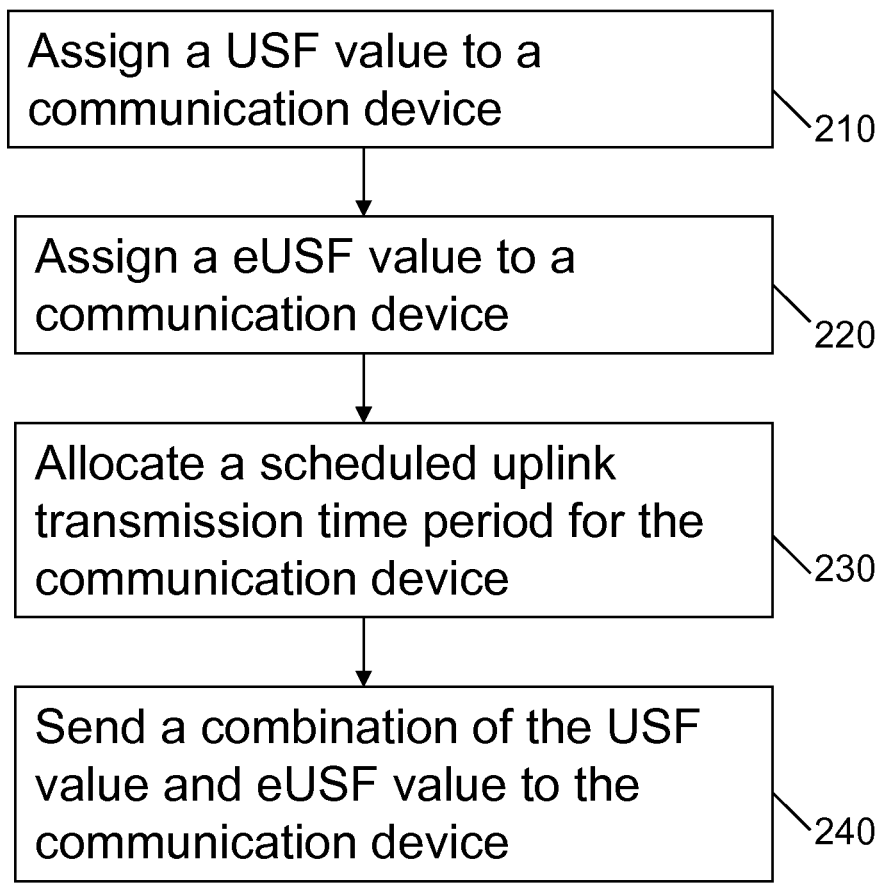
FIG. 2 is a flow chart for a methodology within a radio access network in accordance with the present invention.

Furthermore, according to embodiments of the present invention and as exemplified in FIG. 2, methods in a radio access network are provided for notifying one or more communication devices of uplink transmission time periods scheduled for the communication devices in accordance with what is described in the foregoing. The method as illustrated in FIG. 2 comprises the steps of assigning 210 a legacy USF value to a communication device, assigning 220 an eUSF value to the communication device, allocating a scheduled uplink transmission time period 230 for the communication device and sending 240 a combination of the assigned USF value and the assigned eUSF value to the communication device, thereby notifying the communication device that it has been granted uplink transmission opportunity in a subsequent time period.

Moreover, according to embodiments of the present invention, a control unit for the radio access network is provided. The control unit is adapted to perform one or more of said methods. The control unit may e.g. be or be comprised in a base station or base station controller.

Figure 3:
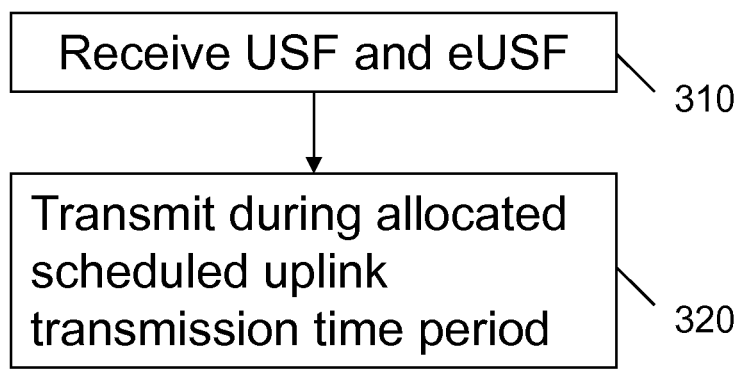
FIG. 3 is a flow chart for a methodology in a communication device according to the present invention.

In addition, according to embodiments of the present invention and as illustrated by way of example in FIG. 3, methods in a communication device for receiving a notification of an allocated scheduled uplink transmission time period are provided. According to the embodiment of the invention as presented in FIG. 3, the method of receiving a notification of an allocated scheduled uplink transmission opportunity comprises the steps of receiving 310 and decoding an address being a combination of an USF and an eUSF and transmitting 320 uplink information during an allocated scheduled uplink transmission time period.

In addition, according to embodiments of the present invention, there is provided a communication device (above referred to as a "new device") for communication in the radio access network. The communication device is adapted to be addressed for notification of scheduled uplink transmission time periods for the communication device with an address, which is a combination of a USF value and an eUSF value that are assigned to the communication device in accordance with what is described in the foregoing.

An advantage of the embodiments of the present invention is that they allow for more devices to be addressed by increasing the effective USF addressing space.

Figure 4:
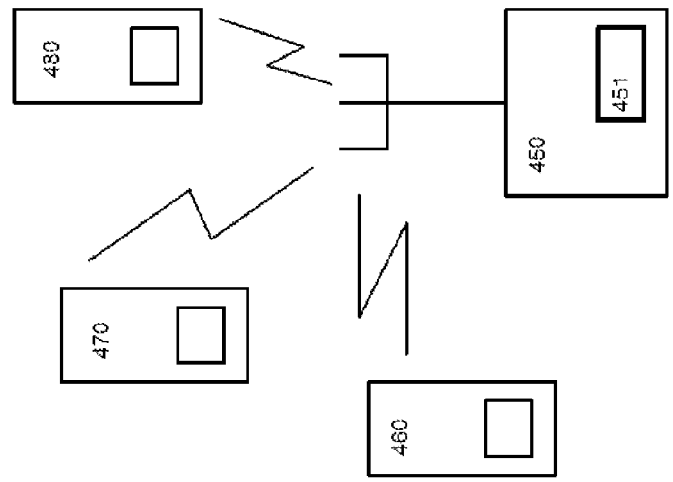
FIG. 4 A is a schematic drawing illustrating mobile terminals connected to one or more base station sites of a communication network, wherein the mobile terminals and/or the communication network may comprise arrangements or perform methods according to some embodiments of the present invention.
Figure 4:
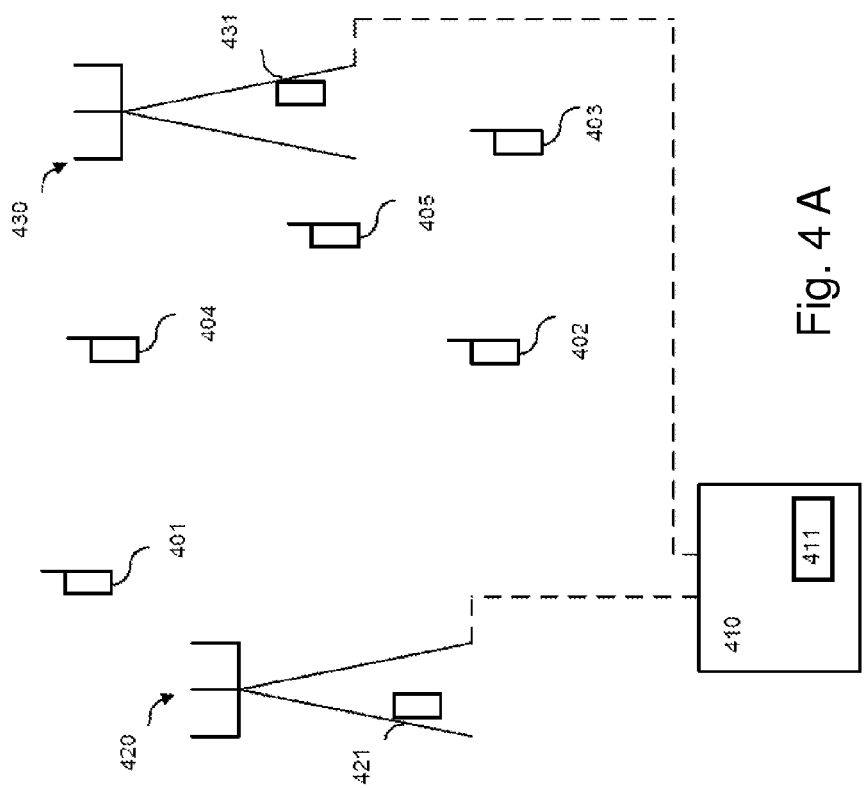

FIG. 4A is a schematic drawing illustrating mobile terminals 401, 402, 403, 404, 405 connected to one or more base station sites 420, 430 of a communication network. Each of the base station sites comprises a base station 421, 431 including a transmitter. The communication network comprises the base station sites 420, 430 and a network controller 410 comprising a processing unit 411. The communication network may also comprise further elements (e.g. network servers). The mobile terminals and/or the communication network may comprise arrangements or perform methods according to some embodiments of the invention. For example, the processing unit 411 and the transmitters of the base stations 421, 431 may perform method steps as those described in connection to FIG. 1 and/or FIG. 2, and the mobile terminals may perform method steps as those described in connection to FIG. 3.

FIG. 4B is a schematic drawing illustrating terminals 460, 470, 480 connected to a communication server 450 comprising a processing unit 451 and a transmitter. The terminals and/or the communication server may comprise arrangements or perform methods according to some embodiments of the invention. For example, the processing unit 451 and the transmitter may perform method steps as those described in connection to FIG. 1 and/or FIG. 2, and the terminals 460, 470, 480 may perform method steps as those described in connection to FIG. 3.

Figure 5:
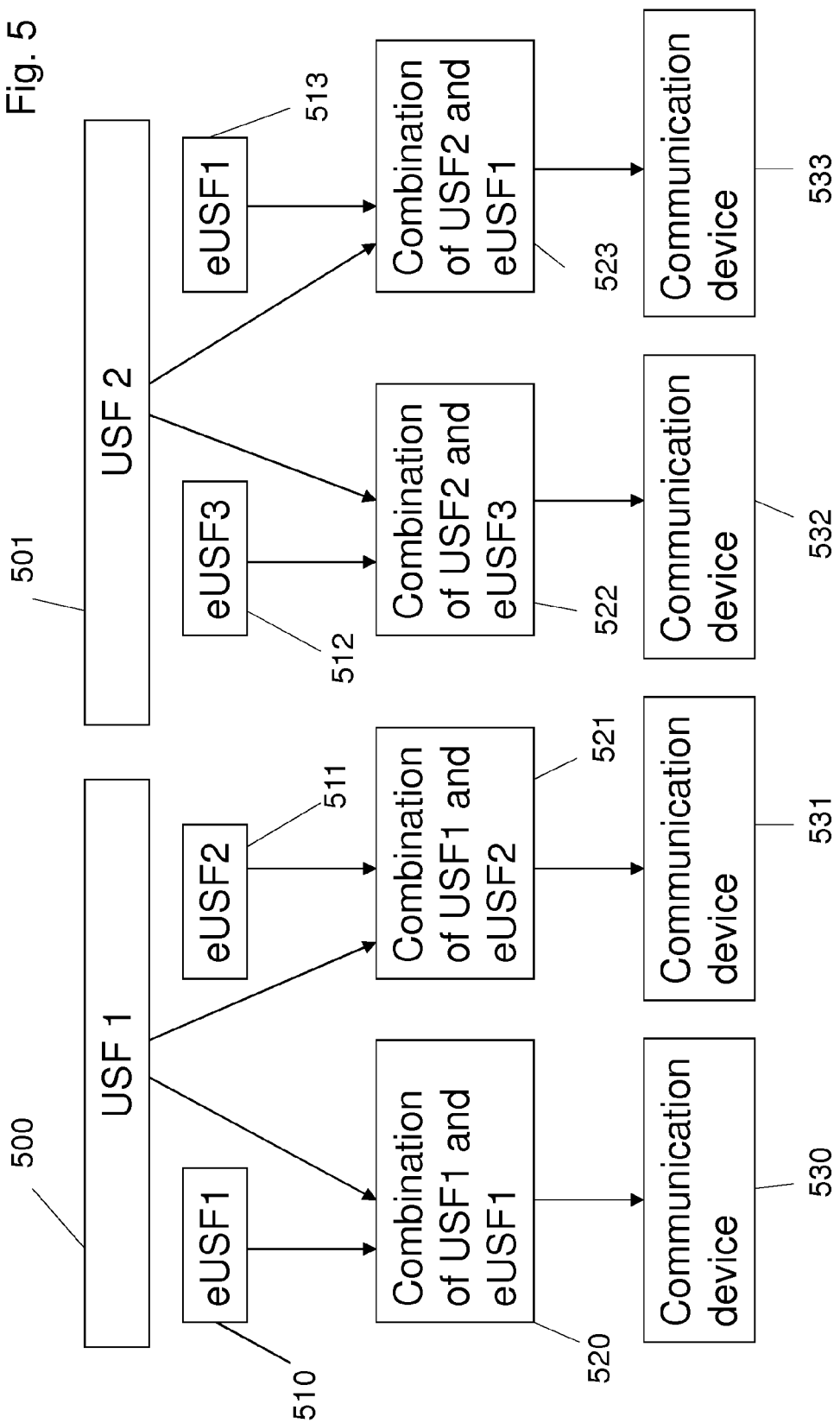
FIG. 5 presents an example of an embodiment of the present invention addressing a group of communication devices according to the invention.

According to an embodiment of the invention there is provided a method of assigning addresses to a plurality of communication devices in a radio access network for use in notification of scheduled uplink transmission time periods for the communication devices. The method comprises, for each communication device in a first set of communication devices, assigning the address of the communication device using the method as described in relation to FIG. 1. An example of the assignment of the legacy USF values and the eUSF values to the communication devices is illustrated in FIG. 5. Legacy value USF1 is assigned to a plurality of communication devices 530, 531 and legacy value USF2 is assigned to another plurality of communication devices 532, 533. Furthermore, an eUSF value (510, 511, 512, 513) is selected and assigned such that the USF value uniquely identifies the communication device among a plurality of communication devices (530, 531, 532, 533) having the same assigned legacy USF value. As also illustrated in FIG. 5, both communication device 530 and 533 may have been assigned the same eUSF value USF1. Since there are different legacy USF values 500, 501 assigned to these communication devices 530, 533 the combination of the legacy USF value 500, 501 and the eUSF value 510, 513 will still provide a unique address, thus uniquely identifying each of the communication devices.

Figure 6:
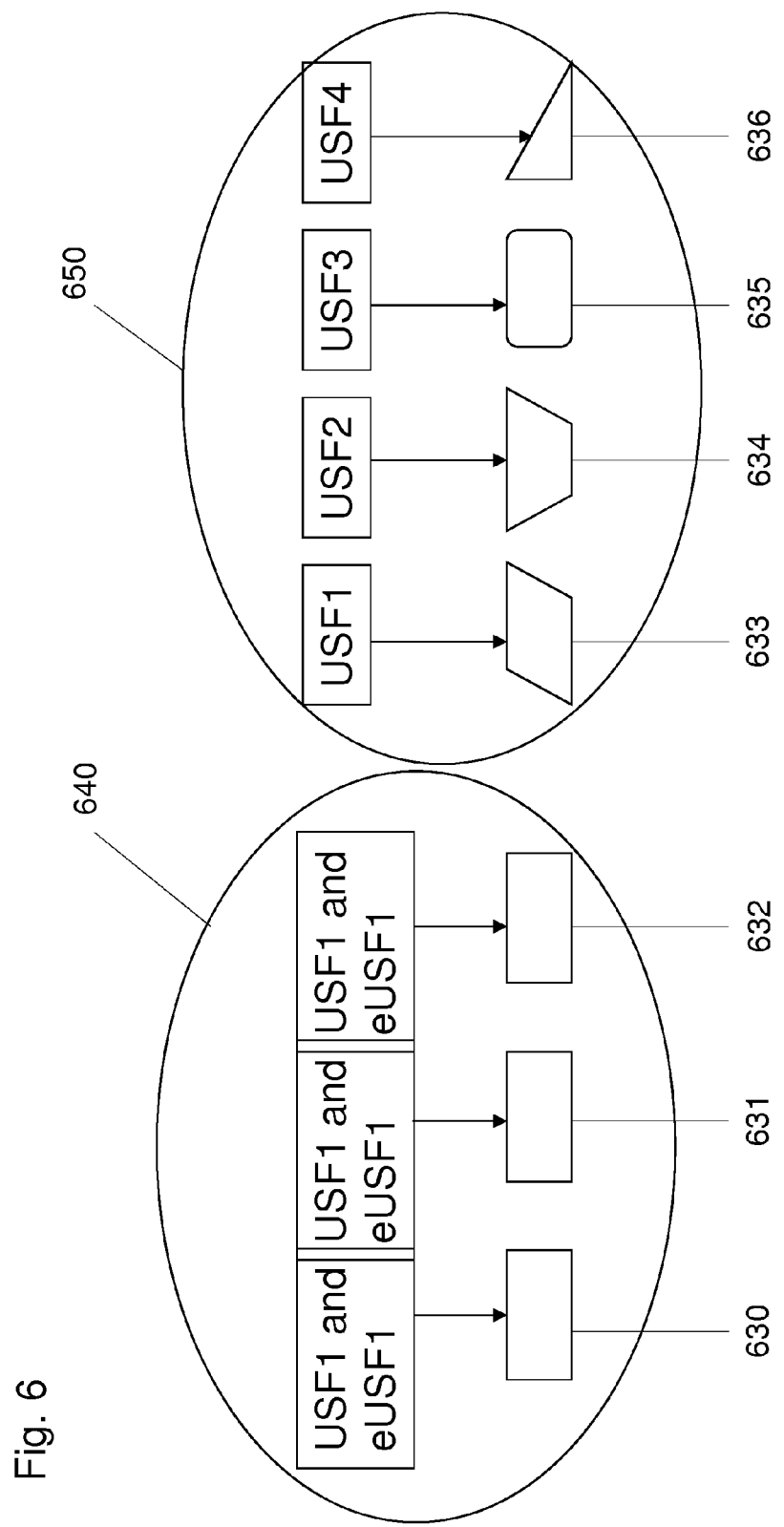
FIG. 6 illustrates another example of an embodiment of the present invention addressing a first and a second group of communication devices.

FIG. 6 describes another example for assigning the legacy USF values and the eUSF values to communications devices, the communication devices being grouped into a first set (640) of communication devices (630, 631, 632) and a second set (650) of communication devices (633, 634, 635, 636). For each communication device within the first set of communication devices, a legacy USF value and an eUSF value are assigned as described above. For each communication device (633, 634, 635, 636) in the second set (650) of communication devices, having no communication device in common with the first set, the address of the communication device is assigned as a unique USF value. Hence, the communication devices in the second set (650) may be addressed in a conventional way with only a USF value, whereas the communication devices in the first set (640) may be addressed with a USF value in combination with an eUSF value.

In the following, an illustrative example is presented. Assume the five legacy USF values 0 through 4 are reserved for legacy MSs, whereas the three legacy USF values 5 through 7 are reserved to be used together with the eUSF field. Also assume that the size of the eUSF field is 2 bits. Then it would be possible to e.g. assign USFs to 5 legacy MSs as well as 12 different new devices according to table 1 below:

TABLE 1

Example of assignment using 3 reserved legacy USF code points to indicate the presence of a new 2-bit Extended eUSF field.

| Legacy USF | | eUSF | | |
| --- | --- | --- | --- | --- |
| Code point | Value | Code point | Value | Assigned to Terminal |
| 000 | 0 | N/A | N/A | Legacy MS 0 |
| 001 | 1 | N/A | N/A | Legacy MS 1 |
| 010 | 2 | N/A | N/A | Legacy MS 2 |
| 011 | 3 | N/A | N/A | Legacy MS 3 |
| 100 | 4 | N/A | N/A | Legacy MS 4 |
| 101 | 5 | 00 | 0 | New Device 0 |
| 101 | 5 | 01 | 1 | New Device 1 |
| 101 | 5 | 10 | 2 | New Device 2 |
| 101 | 5 | 11 | 3 | New Device 3 |
| 110 | 6 | 00 | 0 | New Device 4 |
| 110 | 6 | 01 | 1 | New Device 5 |
| 110 | 6 | 10 | 2 | New Device 6 |
| 110 | 6 | 11 | 3 | New Device 7 |
| 111 | 7 | 00 | 0 | New Device 8 |
| 111 | 7 | 01 | 1 | New Device 9 |
| 111 | 7 | 10 | 2 | New Device 10 |
| 111 | 7 | 11 | 3 | New Device 11 |

Here, in total 5+12=17 devices are assignable compared with the 8 possible if using the legacy USF field only, hence an increase by more than 100%.

In general, by using the proposed methodology and by assuming that L legacy USF code points are reserved for the new devices and furthermore assuming that new code points of M bits to be used for the eUSF are found, it will be possible to address 7-L legacy MSs and $L*2^M$ new devices, as illustrated by the following table 2:

TABLE 2

The number of assignable new devices and legacy MSs as a function of L (the number of legacy USF code points reserved for the new devices) and M (the number of bits in the new eUSF field).

| L | No. of legacy MSs | M=0 | M=1 | M=2 | M=3 | M=4 | M=9 | M=20 |
|---|---|---|---|---|---|---|---|---|
| 0 | 7 | 0 | 0 | 0 | 0 | 0 | 0 | 0 |
| 1 | 6 | 1 | 2 | 4 | 8 | 16 | 512 | 1048576 |
| 2 | 5 | 2 | 4 | 8 | 16 | 32 | 1024 | 2097152 |
| 3 | 4 | 3 | 6 | 12 | 24 | 48 | 1536 | 3145728 |
| 4 | 3 | 4 | 8 | 16 | 32 | 64 | 2048 | 4194304 |
| 5 | 2 | 5 | 10 | 20 | 40 | 80 | 2560 | 5242880 |
| 6 | 1 | 6 | 12 | 24 | 48 | 96 | 3072 | 6291456 |
| 7 | 0 | 7 | 14 | 28 | 56 | 112 | 3584 | 7340032 |
|   |   | \multicolumn{7}{c}{No of new devices} |

The decision of which legacy USF code points that are to be reserved for legacy USF operation and which shall be used in conjunction with the new eUSF field may e.g. be up to the GERAN network. The network may e.g. dynamically change how many code points that are reserved to which category (L above). Also, a new device can, in some embodiments of the present invention, be assigned USFs in the legacy manner without the use of the new eUSF field, and can also, in some embodiments of the present invention, be re-assigned between the different methodologies. Furthermore, note that the values of M considered in table 2 above are merely examples that are not limiting.

Furthermore, the reservation of legacy USF code points may be made dynamically. That is, which legacy USFs that are reserved can be dynamically changed over time depending on the current mix of legacy MSs and new devices on the PDCH(s). The legacy USF code point, to be combined with eUSF values (for new devices), can also be assigned dynamically at setup of the uplink TBF (Temporary Block Flow). For example, if the allocation concerns a new device and there is currently no legacy USF code point reserved for combination with eUSF values and with corresponding eUSF values available, a new legacy USF code point may be reserved for combination with eUSF values.

Different alternatives for the location of the eUSF bits in the RLC/MAC block are discussed below. The legacy USF is encoded separately from the user data, and can thus be addressed to another user than the one to which the downlink payload is addressed. This property is desired also for the eUSF field in some embodiments of the present invention. There are a number of possibilities in how and where the bits needed for the eUSF-fields can be conveyed from the network to the terminal/device in the downlink. Below is a listing of some of these options.

1. Use the Spare Bits in the RLC/MAC Header

Many of the downlink RLC/MAC header types have spare bits that are not used. These can be used to form the new eUSF field. The header is not as well protected against errors as the legacy USF field, but is robust enough for these purposes in most cases. An advantage of this option is that no channel coding is impacted and hence full backwards compatibility is possible. The maximum number of spare bits in any conventional RLC/MAC header is 2. Hence according to Table 2 above, this means that as most 28 devices are assignable in this manner. Furthermore, spare bits are only available in downlink RLC/MAC Header Types 4 through 10, and thus the solution is feasible for EGPRS2B and to some extent EGPRS2A, but not EGPRS (Enhanced General Packet Radio Service).

2. Define New Downlink RLC/MAC Blocks

Another option is to define new downlink RLC/MAC blocks for all MCSs (Modulation and Coding Schemes), which already from the start contain the new eUSF field in the RLC/MAC header. This means that one needs to find the channel coding bits needed for the eUSF field. These coding bits thus needs to be taken from the coding bits of other parts of the downlink RLC/MAC block such as e.g. from the legacy USF field, from the user-plane data, or from the rest of the RLC/MAC header. Regardless of which, the channel-coding might need to be re-worked, which might impact the existing fields. Therefore, backwards compatibility might not be possible for this option. An advantage of the option is that the number of bits used for the eUSF as well as its robustness can be optimized better and in a more flexible way than if using the existing spare bits only. Furthermore, downlink transmission need not be limited to EGPRS2B and EGPRS2A. Due to the impact on the RLC/MAC headers and possibly other parts of the downlink RLC/MAC block, legacy interworking might not be possible. In such cases, the new devices cannot be assigned on the same downlink resources as legacy MSs, and thus legacy multiplexing might not be possible.

3. Use the PAN-field for the eUSF

When FANR (Fast Ack/Nack Reporting) and/or EGPRS2 is used, the network may include a PAN in the downlink data. This PAN is encoded together with its CRC separately from the user data, and can in the same way as for the legacy USF be addressed to another user than the one to which the downlink payload is addressed. This option might limit the possibility to send PANs, and thus impact the usage of FANR in the downlink.

The PAN field (including the CRC) might not be robust enough to be used for the eUSF field directly. This can e.g. be counteracted by reducing the number of used information bits in the PAN field (today 20 bits) down to e.g. 9 bits, which would according to Table 2 above allow for up to 3584 devices. Furthermore, one or both of the alternatives a) and b) below may be employed:

a) The no-longer-used information bits may be used for the CRC (which today is 10 bits). For example, if reducing the number information bit down to e.g. 9 bits, this would give a possible CRC of up to 10+(20−9)=21 bits, which will improve error correction/detection of the eUSF.

b) The code rate of the transmitted PAN field (including CRC) may be reduced, which will improve the robustness of the eUSF field. For example, if reducing the number information bit down to e.g. 9 bits whilst keeping the CRC to 10 bits, this would e.g. for DAS-8 give a code-rate of (9+10)/78=0.24 to be compared with the (20+10)/78=0.38 for the PAN field employed today.

As hinted above, alternatives a) and b) can be combined to achieve even better robustness that might e.g. be on par with the robustness of the legacy USF. What the number of bits for CRC and eUSF should be may be decided from case to case, e.g. based on computer simulations. For situations where the robustness of the current PAN field is deemed good enough, all of the 20 information bits in the PAN field can be used, which will provide for assignment of up to 7340032 devices.

In order for the receiver to determine if it should interpret the PAN field as a conventional PAN or as an eUSF, it is proposed according to some embodiments of the present invention that the network shall reserve one TFI (Temporary Flow Identity) value for this purpose. Upon decoding the PAN field, if this reserved TFI value is detected, then the PAN field shall be interpreted it as an eUSF, otherwise as a conventional PAN.

An advantage of the option of using the PAN field for the eUSF is that a relatively large number of bits may be used for the eUSF field, which thus may allow for several hundred, maybe thousands of new devices to be assigned unique USF values (i.e. legacy USF value or legacy USF value in combination with eUSF value). Furthermore, with this option, no practical limitations are set on which MCSs that can be used, except for MCS-4 and MCS-9 that cannot carry PANs. However, this is normally not a practical problem since the network can use e.g. MCS-3 and MCS-8 instead. This also means that there are no major multiplexing limitations with respect to. legacy MSs. Moreover, full backwards compatibility is possible since the network may ensure that only the new eUSF field is addressed to the new devices.

For this option, multiplexed legacy MSs need to be FANR capable, which means legacy MSs compliant with 3GPP GERAN Rel-7 or later. Furthermore, no PAN can be transmitted in the same downlink RLC/MAC block as an RLC/MAC block containing the eUSF field. This means that FANR might not be used, or its use might be limited, when this alternative for placing the eUSF in the RLC/MAC block is employed.

4. Use Orthogonal TSCs as in VAMOS—Alternative One: Transmit Only VAMOS TSC in Parallel Currently, a work item named VAMOS is standardized in 3GPP GERAN Rel-9,where new orthogonal training sequences codes, TSCs, are introduced, which could be re-used for the eUSF. This can be done by assigning each new device a legacy USF value as well as an additional TSC, taken from the VAMOS TSCs and orthogonal to the legacy TSC. The legacy USF is a reserved USF which is used by many terminals. One specific orthogonal VAMOS TSC thus corresponds to one value of the eUSF. In other words, the eUSF is represented with a TSC.

Since the receiving new device only needs to decode the TSC and nothing more, there is no need to transmit a full radio block using the VAMOS TSC. Instead a new burst format may be created that can contain the TSC only. In this manner, the amount of interference in the rest (header, data, PAN etc.) of the legacy radio block can be kept to a minimum. The legacy MSs might need to be SAIC/DARP-I (SAIC=Single-Antenna Interference Cancellation, DARP=Downlink Advanced Receiver Performance) capable in order to suppress the extra interference.

Whenever a device capable of reading the eUSF finds its reserved legacy USF, it also tries to decode its orthogonal VAMOS TSC. In case it decodes that successfully it knows that it is USF scheduled and prepares for transmission in the next block period. When the network wants to schedule a new device it transmits the DL block including the reserved legacy USF where this terminal is assigned on, and then in parallel transmits a new "radio block" with the orthogonal VAMOS TSC this new device is assigned.

Since there are 8 legacy USF code points and 8 different VAMOS TSCs, this gives a maximum total of 8*8=64 possible new devices that could be addressed in this manner. An advantage of this option is that it does not require any additional spare bits and thus does not occupy any bits that can be used for other purposes. Furthermore, the re-use of the VAMOS concept results in a relatively limited implementation cost in communication devices and network. Moreover, the amount of generated extra interference for the legacy user would normally be relatively limited, since the parallel VAMOS-like eUSF transmission will only overlap its TSC and not the full radio block.

New devices capable of using the eUSF with this option should support new TSCs as for VAMOS and also be capable of decoding bursts blocks sent with different TSCs in parallel.

If multiplexed legacy MSs are only SAIC/DARP-I capable, then only GMSK modulation (i.e. MCS-0 to MCS-4) can be used for the instants when the new VAMOS TSC bursts are transmitted. If this is considered a limitation, then more advanced DARP-II capable legacy MSs may be used instead.

5. Use Orthogonal TSCs as in VAMOS—Alternative Two: Transmit Full Radio Block in Parallel An alternative to the alternative proposed under item 4 above is to instead transmit a full downlink radio block, or full RLC/MAC block. That is, instead of letting each VAMOS TSC represent an individual eUSF value (as for item 4 above), each VAMOS TSC represents a set of eUSF values. How many such eUSF values that can be accommodated per VAMOS TSC depends upon how much information that can be carried in the corresponding RLC/MAC block.

Below, three options are presented for how to convey the eUSF values in this radio block transmitted with the orthogonal VAMOS TSC:

a) Use the legacy USF field. Since there are 8 legacy USF code points in the legacy transmitted radio block, and 8 different VAMOS TSCs and 8 legacy USF code points in the radio block send with the VAMOS TSC, this gives a maximum total of 8*8*8=512 possible new devices that could be addressed in this manner.

b) Use new downlink RLC/MAC blocks as defined under item 2 above. By in addition using the orthogonal TSC-approach, the impact on legacy MSs will be reduced in comparison.

c) Let the eUSF be included as payload in e.g. a MCS-0 or CS-1 block. Since this allows for a maximum of 20 octets payload, this would make it possible to address a maximum total of 8*8*20*8=10240 devices in this manner.

In addition to the advantages presented under item 4 above, this option provides for the possibility of addressing even more devices.

6. Uplink Scheduling Message

A new downlink control message, in the following referred to as an Uplink Scheduling Message, may be introduced that provides information about uplink scheduling for the new devices, sharing legacy USF(s), for a certain number of coming radio blocks.

The new control message may contain information about what uplink radio blocks a new device, i.e. when the combination of legacy USF and eUSF value assigned to that new device, are scheduled for transmission. The control message may then be directed to all the devices on the PDCH but it may e.g. only be used by the new devices, allocated an eUSF in addition to the legacy USF. It can thus be seen as a distribution message. In the downlink headers that, in the legacy mechanism, are used for scheduling of transmission in the corresponding uplink radio blocks, the legacy USF assigned to the new device may be set. The legacy MSs will still be uplink scheduled with their legacy USF values, as today. When pre-scheduling uplink radio blocks for the new devices (with the new control message) the network may need to leave space for uplink scheduling of the legacy MSs and for RRBP (Relative Reserved Block Period) polling.

The Uplink Scheduling Message may comprise information about specific uplink radio blocks where identified new devices (i.e. addressed with legacy USF/eUSF combinations) are scheduled in the near future. It is then also possible to define uplink scheduling patterns that are to be used and which then can be used in order to pre-schedule uplink radio blocks for the new devices for a longer period of time with reduced signaling.

An advantage of this option is that it is fully backwards compatible with respect to interworking with legacy MSs. Furthermore, no updates in the legacy downlink RLC/MAC headers is needed. Moreover, the number of devices that can be addressed may be relatively high.

The new devices, that are capable of reading the eUSF in accordance with one or more of the embodiments of the present invention described above, need to make the network aware of their capability. This can be achieved in a number of ways. For example, a new device may indicate its capabilities of reading eUSF values in the MS Radio Access Capability IE (Information Element). An additional bit may need to be added to the IE for this purpose.

An alternative solution is to introduce a new type of access burst in addition to the legacy access bursts. This access burst is then to be used by these new devices. Whenever the network detects this new access burst, it will know that it originates from such a new device that is capable of reading the eUSF field. The new access burst could e.g. be defined as a new code point in the 3GPP 44.060 EGPRS PACKET CHANNEL REQUEST message or by introducing a new training sequence that the new device shall use when transmitting the access request message (EGPRS PACKET CHANNEL REQUEST).

The information the network may need to provide to such a new device may include one or more of:

The legacy USF value for the device (reserved or dynamically assigned as described above).

An indication if the device shall interpret the legacy USF in the legacy way, i.e. as a full legacy USF, or in the new way, i.e. as a prefix for the eUSF field as described in detail above.

If the new device shall interpret the legacy USF in said new way, the eUSF value assigned to the new device.

Possibly the new TSC to be used for the new device (applicable to the options presented under items 4 and 5 above).

Such information elements provided by the network to the new devices may e.g. be included in the messages transmitted from the network to the device upon assignment, i.e. the uplink assignment or reconfiguration messages, such as e.g. the Packet Uplink Assignment, Multiple TBF Uplink Assignment, Packet CS Release, Packet Timeslot Reconfigure Message or Multiple TBF Timeslot Reconfigure messages. Another option is to define totally new messages for this purpose.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended claims.

The invention claimed is:

1. A method in a radio access network of notifying a communication device of an uplink transmission time period scheduled for the communication device, the method comprising:
sending, to the communication device, an uplink state flag (USF) value assigned to the communication device; and
sending, to the communication device, an extended USF (eUSF) value assigned to the communication device;
whereby the communication device is notified that it has been granted uplink transmission opportunity in a subsequent time period;
wherein the radio access network is a GERAN and wherein the eUSF value is represented with an orthogonal training sequence code (TSC).

2. A communication device for communication in a radio access network, wherein the communication device comprises a control processor that is adapted to be addressed for notification of scheduled uplink transmission time periods for the communication device with an address that is a combination of an uplink state flag (USF) value and an extended USF (eUSF) value that are assigned to the communication device, wherein the radio access network is a GERAN and wherein the eUSF value is represented with an orthogonal training sequence code (TSC).

* * * * *